(12) United States Patent
Lin et al.

(10) Patent No.: US 7,541,701 B2
(45) Date of Patent: Jun. 2, 2009

(54) TOTALLY ENCLOSED FAN COOLED MOTOR

(75) Inventors: Chih M. Lin, Tipp City, OH (US);
William J. Watkins, Tipp City, OH (US); Oscar Romero, El Paso, TX (US);
Janice Fitzgerald, Mequon, WI (US);
John R. Belko, Tipp City, OH (US);
Ming Kuo, Fox Point, WI (US)

(73) Assignee: A.O. Smith Corporation, Milwaukee, WI (US)

( * ) Notice: Subject to any disclaimer, the term of this patent is extended or adjusted under 35 U.S.C. 154(b) by 20 days.

(21) Appl. No.: 11/759,730

(22) Filed: Jun. 7, 2007

(65) Prior Publication Data
US 2007/0284954 A1    Dec. 13, 2007

Related U.S. Application Data

(60) Provisional application No. 60/811,635, filed on Jun. 7, 2006.

(51) Int. Cl.
*H02K 9/00* (2006.01)

(52) U.S. Cl. ........................................ 310/58
(58) Field of Classification Search .................. 310/89, 310/58, 59, 63, 62, 71; 417/423.8, 423.14
See application file for complete search history.

(56) References Cited

U.S. PATENT DOCUMENTS

| | | | |
|---|---|---|---|
| 1,782,458 A | 11/1930 | Brennen | |
| 2,117,915 A | 5/1938 | Shutt | |
| 2,338,515 A | 1/1944 | Johns | |
| 3,127,531 A | 3/1964 | Tothero | |
| 3,675,056 A * | 7/1972 | Lenz | 310/54 |
| 4,028,570 A | 6/1977 | Kieffer et al. | |
| 4,406,959 A | 9/1983 | Harano et al. | |
| 4,742,257 A | 5/1988 | Carpenter | |
| 4,839,547 A | 6/1989 | Lordo et al. | |
| 4,908,538 A | 3/1990 | Geberth, Jr. | |
| 4,931,678 A | 6/1990 | Lutz | |
| 5,173,629 A | 12/1992 | Peters | |

(Continued)

FOREIGN PATENT DOCUMENTS

DE    889793 C    9/1953

(Continued)

OTHER PUBLICATIONS

PCT/US2007/070620 International Search Report and Written Opinion dated Jul. 9, 2008, 17 pages.

*Primary Examiner*—Javaid Nasri
(74) *Attorney, Agent, or Firm*—Michael Best & Friedrich LLP (57) ABSTRACT

A motor assembly comprises a first end frame, a second end frame including at least one air outlet aperture, an air shroud surrounding a stator between the first end frame and the second end frame, the air shroud cooperating with the stator to form at least one air passage, and cooperating with the first end frame to form at least one air inlet aperture. The motor assembly also comprises a fan mounted on the rotating shaft, the fan operable to generate an air flow of ambient air through the at least one air inlet aperture, the at least one air passage and the at least one air outlet aperture.

20 Claims, 13 Drawing Sheets

U.S. PATENT DOCUMENTS

| | | | |
|---|---|---|---|
| 5,311,090 A | 5/1994 | Ferlatte | |
| 5,559,380 A | 9/1996 | Nakamura et al. | |
| 5,657,723 A * | 8/1997 | Edelmann et al. | 123/41.31 |
| 5,982,071 A | 11/1999 | Ehrick | |
| 6,011,331 A | 1/2000 | Gierer et al. | |
| 6,093,990 A | 7/2000 | Meeks et al. | |
| 6,172,436 B1 | 1/2001 | Subler et al. | |
| 6,177,744 B1 | 1/2001 | Subler et al. | |
| 6,183,208 B1 | 2/2001 | Qandil et al. | |
| 6,413,061 B1 | 7/2002 | Esumi et al. | |
| 6,435,836 B1 * | 8/2002 | Kobayashi et al. | 417/12 |
| 6,563,240 B2 | 5/2003 | Lin et al. | |
| 6,680,550 B2 | 1/2004 | Matsunaga et al. | |
| 6,734,584 B1 | 5/2004 | Browne et al. | |
| 6,798,096 B2 | 9/2004 | Browne et al. | |
| 6,882,070 B2 | 4/2005 | Staigl, III et al. | |
| 6,933,638 B2 | 8/2005 | Hirth | |
| 6,933,640 B2 | 8/2005 | Schurter et al. | |

FOREIGN PATENT DOCUMENTS

| | | |
|---|---|---|
| EP | 0 581 966 | 9/2004 |
| GB | 911769 A | 11/1962 |
| GB | 2220800 A | 1/1990 |

* cited by examiner

TOTALLY ENCLOSED FAN COOLED MOTOR

RELATED APPLICATIONS

This application claims priority to Provisional Patent Application No. 60/811,635 filed on Jun. 7, 2006.

BACKGROUND

The present invention relates to motors, and particularly to pump motors.

SUMMARY

In one embodiment, the invention provides a motor assembly comprising: a stator including a set of windings; a rotor mounted on a rotating shaft and operable to rotate with respect to the stator; a first end frame coupled to the stator and rotatably supporting the shaft; a second end frame coupled to the stator and rotatably supporting the shaft, the second end frame including at least one air outlet aperture; an air shroud surrounding the stator between the first end frame and the second end frame, the air shroud cooperating with the stator to form at least one air passage, and cooperating with the first end frame to form at least one air inlet aperture, the at least one air inlet aperture, the at least one air passage and the at least one air outlet aperture being in fluid communication with one another; and a fan mounted on the rotating shaft, the fan operable to generate an air flow of ambient air through the at least one air inlet aperture, the at least one air passage and the at least one air outlet aperture.

In another embodiment, the invention provides a motor assembly comprising: a stator including a set of windings; a rotor mounted on a rotating shaft and operable to rotate with respect to the stator; a first end frame coupled to the stator and rotatably supporting the shaft; a second end frame coupled to the stator and rotatably supporting the shaft; an air shroud mounted between the first end frame and the second end frame, the air shroud enclosing the stator; and a housing coupled to the air shroud and defining an inner space containing an electronic module operable to control the motor assembly, the housing including a cap operable to permanently seal the inner space.

In another embodiment, the invention provides a motor assembly comprising: a stator including a set of windings; a rotor mounted on a rotating shaft and operable to rotate with respect to the stator; a first end frame rotatably supporting the shaft and coupled to the stator to form a first compartment enclosing at least one portion of the set of windings; and a thermostat coupled to the first end frame such that the thermostat is enclosed in the first compartment in thermal relationship with the at least one portion of the set of windings.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein is for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 8A:
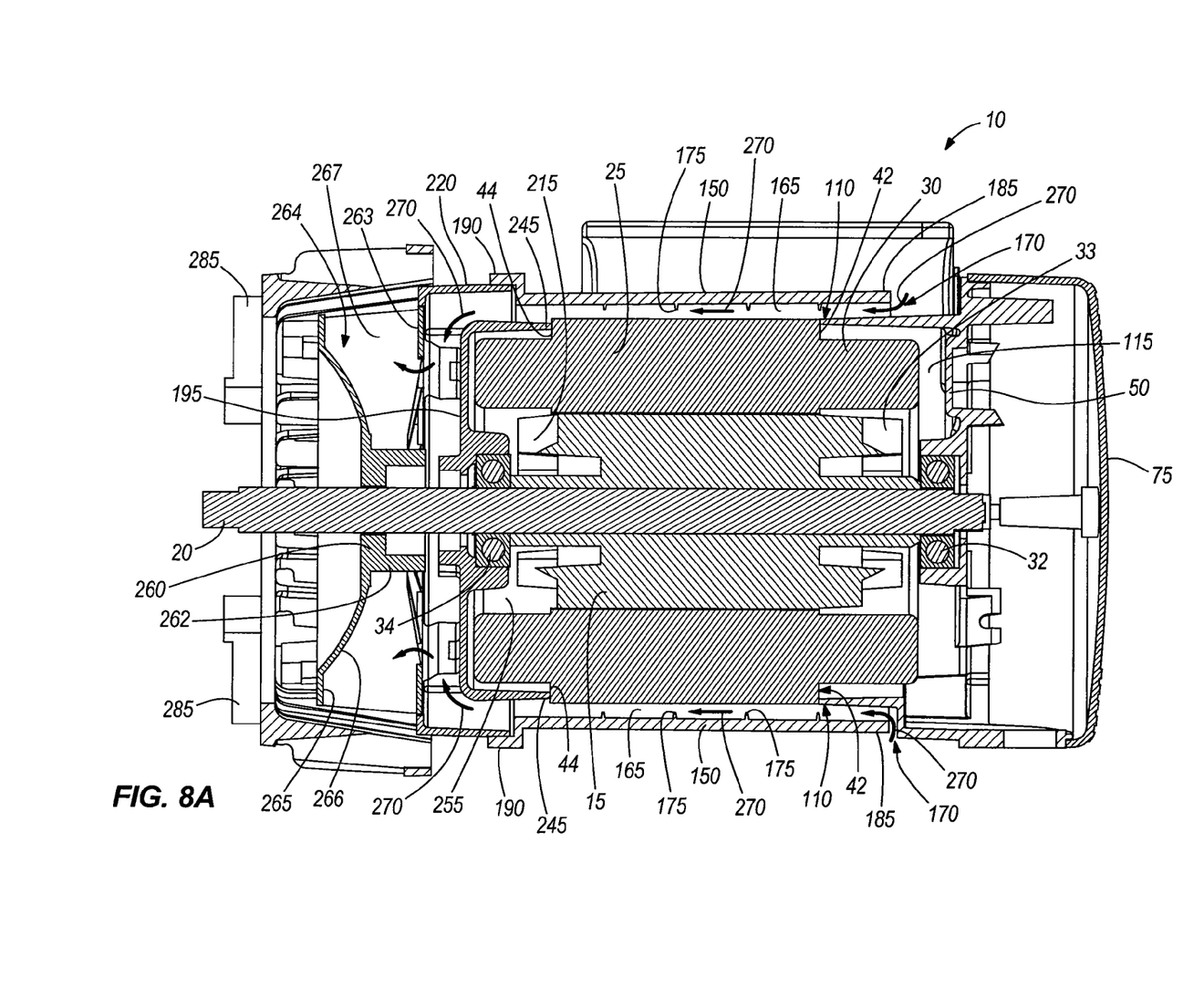
FIG. 8A is a section view of the motor assembly along line 8A-8A shown in FIG. 7.
Figure 8B:
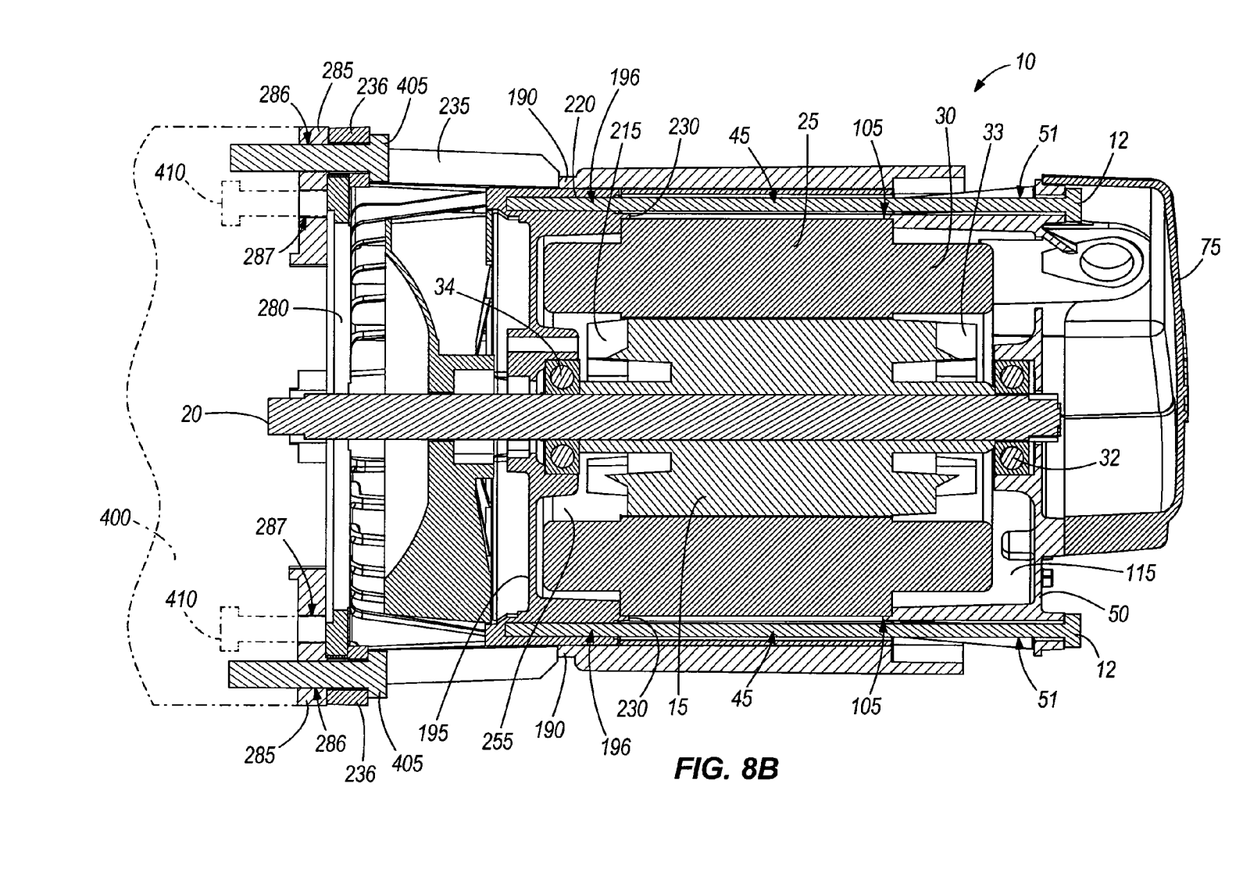
FIG. 8B is a section view of the motor assembly along line 8B-8B shown in FIG. 7.

FIGS. 1-14 illustrate a motor assembly 10 according to one embodiment of the present invention. With reference to FIGS. 8A and 8B, the motor assembly 10 includes a rotor 15 mounted on a rotating shaft 20, and a stator 25 including a number of windings 30 (also illustrated in FIGS. 2 and 3). The rotor 15 is operable to rotate with respect to the stator 25 as a result of applying a current through the windings 30. The rotor 15 includes a first integrally formed fan 33 (also shown in FIG. 10) operable to generate an air flow within a first inner space 115, and a second integrally formed fan 215 operable to generate an air flow within a second inner space 255, further described below. The motor assembly 10 also includes a first bearing 32 supporting the shaft 20 relative to a first end frame 50, and a second bearing 34 supporting the shaft 20 relative to an opposite second end frame 195.

Figure 1:
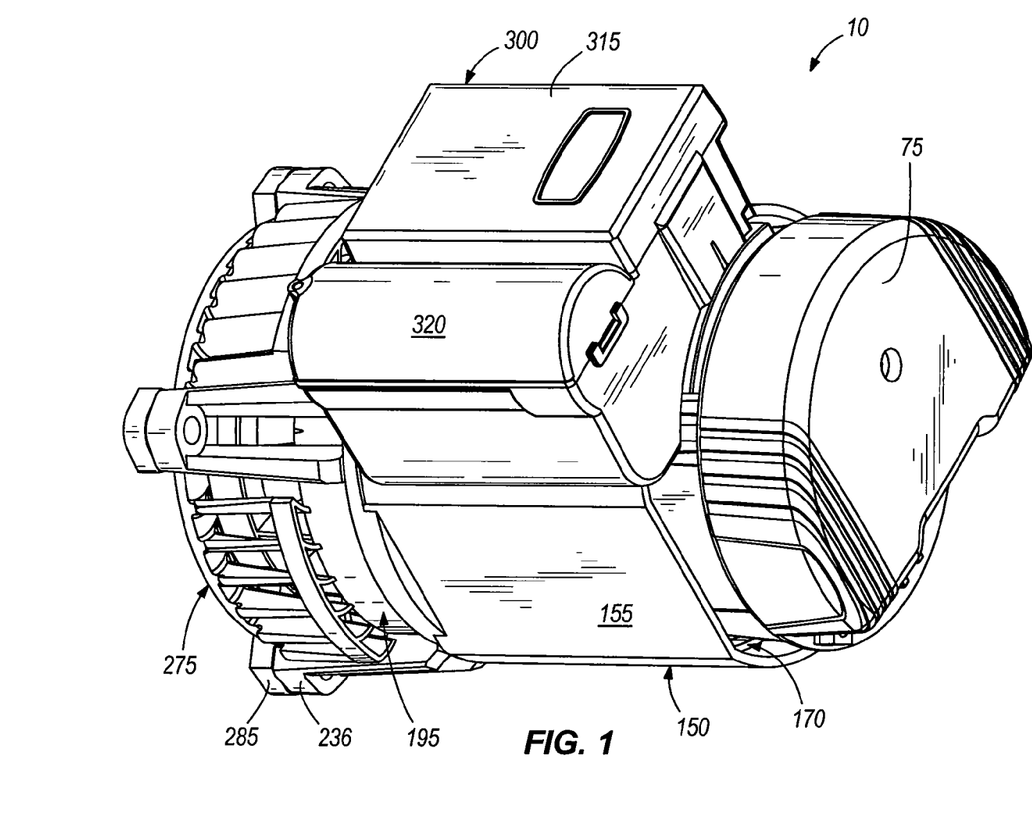
FIG. 1 is a perspective view of a motor assembly according to one embodiment of the present invention.
Figure 2:
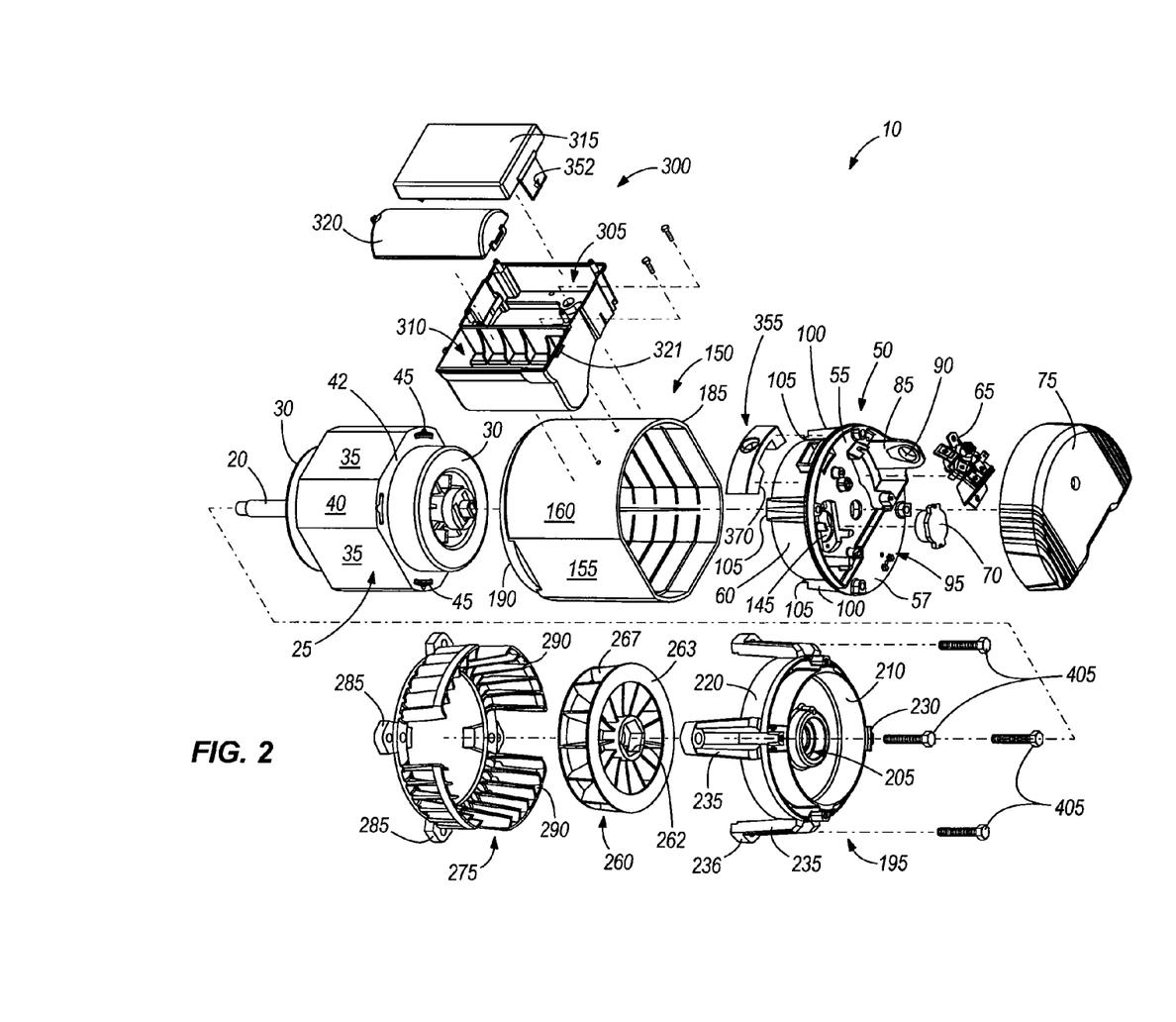
FIG. 2 is a first exploded view of the motor assembly.
Figure 3:
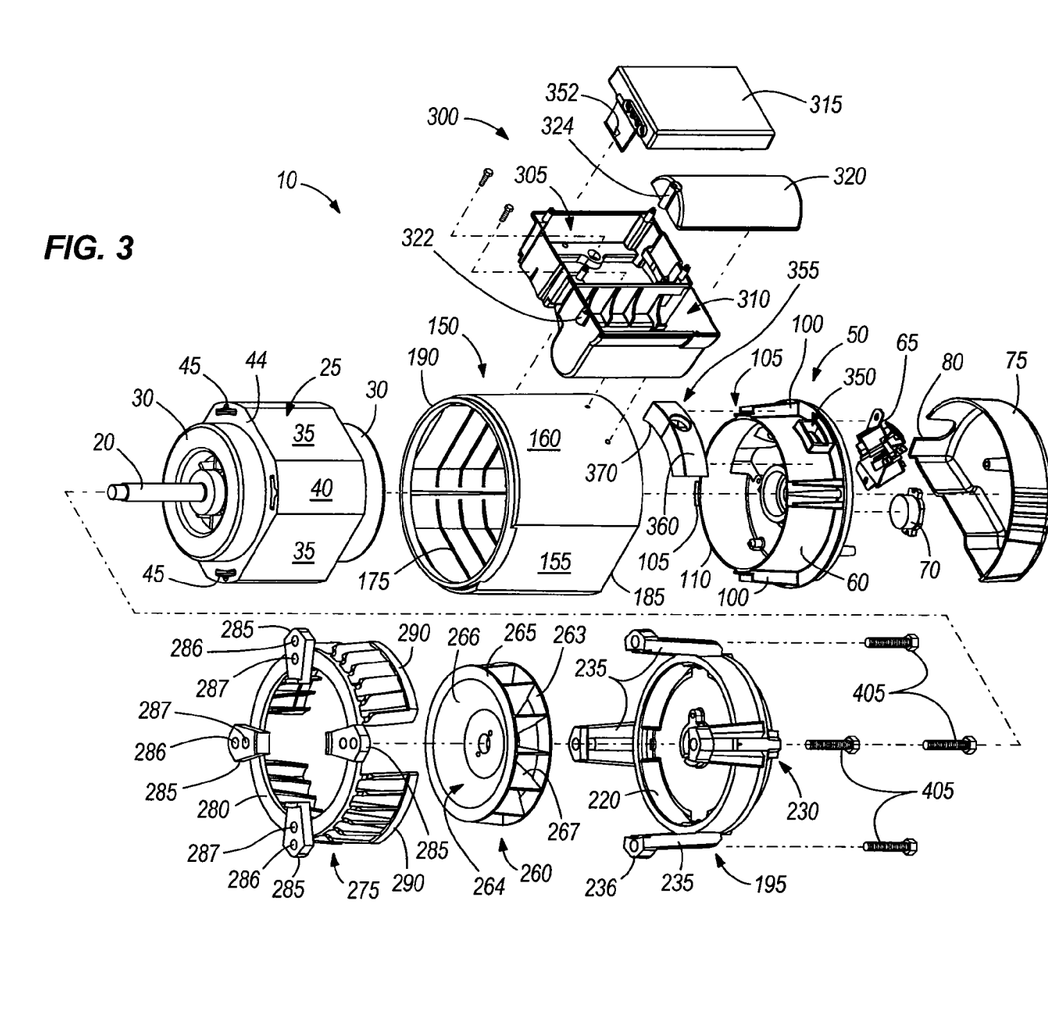
FIG. 3 is a second exploded view of the motor assembly.
Figure 10:
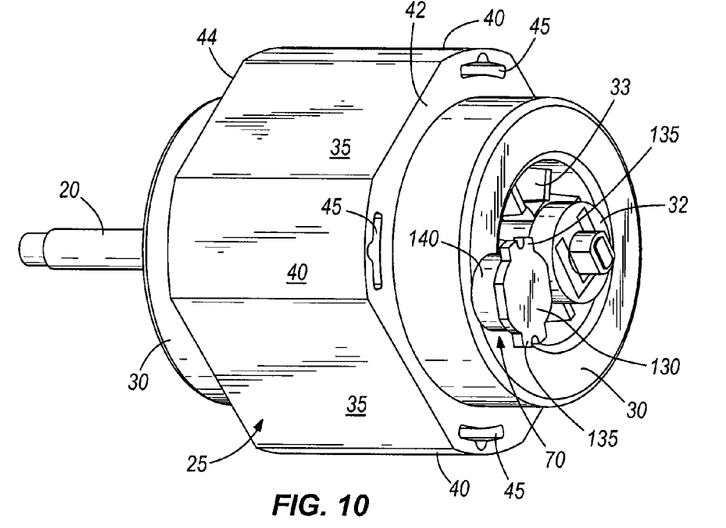
FIG. 10 is a perspective view of a thermostat coupled to the windings of the stator illustrated in FIG. 6.

For ease of description, it is assumed that the stator 25 is manufactured with a number of stacked laminations (not specifically shown). However, it is to be understood that other manufacturing processes to form the stator 25 fall within the scope of the invention. As illustrated in FIGS. 2, 3 and 10, the stator 25 includes four substantially flat surfaces 35 and four arcuate surfaces 40 defining the outer surface of the stator 25. Each arcuate surface 40 is between two flat surfaces 35. The stack of laminations also includes opposite first and second ends 42 and 44. Four through apertures 45 (only three shown in the referenced figures) extend between the ends 42 and 44.

Figure 6:
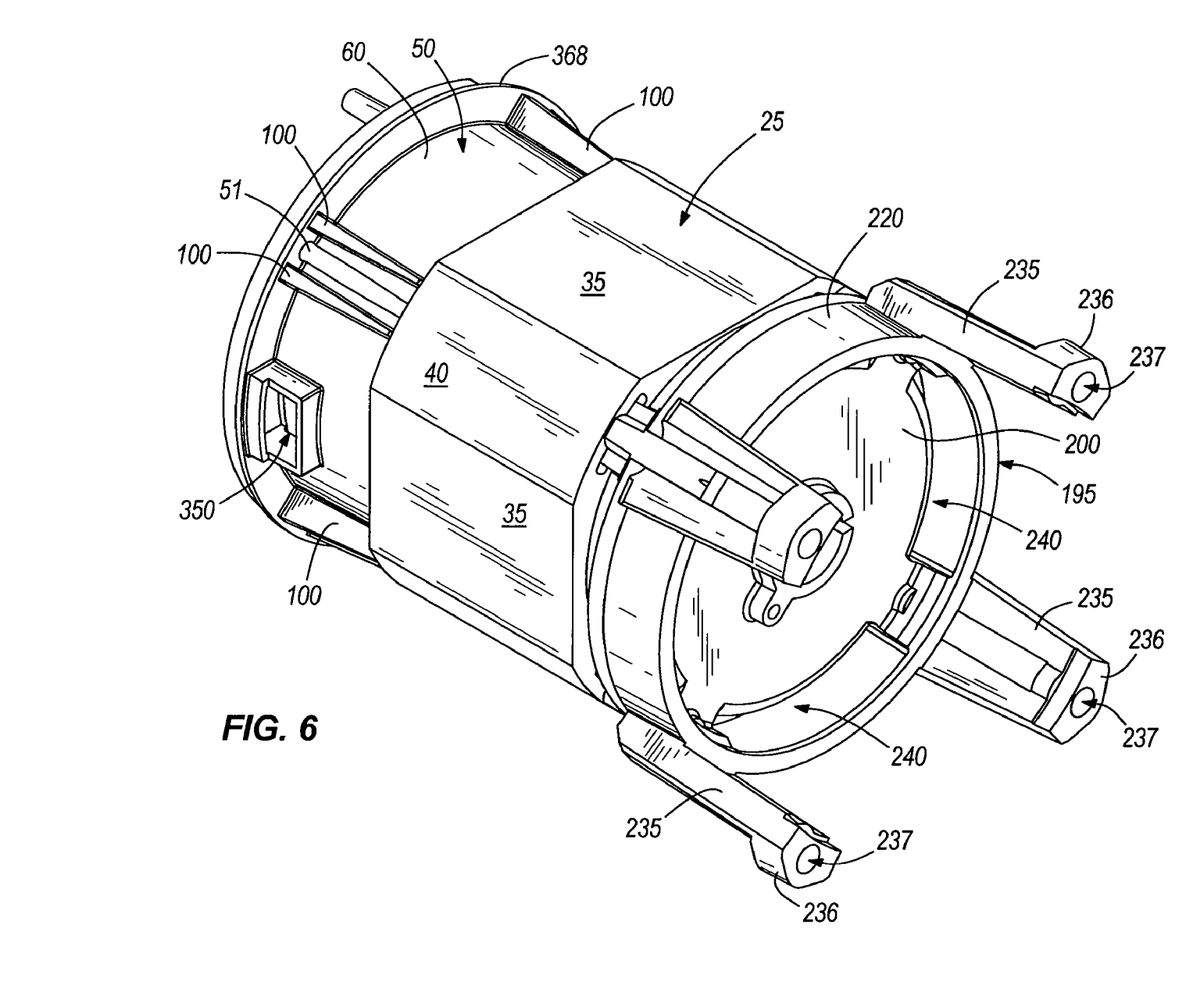
FIG. 6 is a perspective view of a first end frame and a second end frame coupled to a stator.
Figure 7:
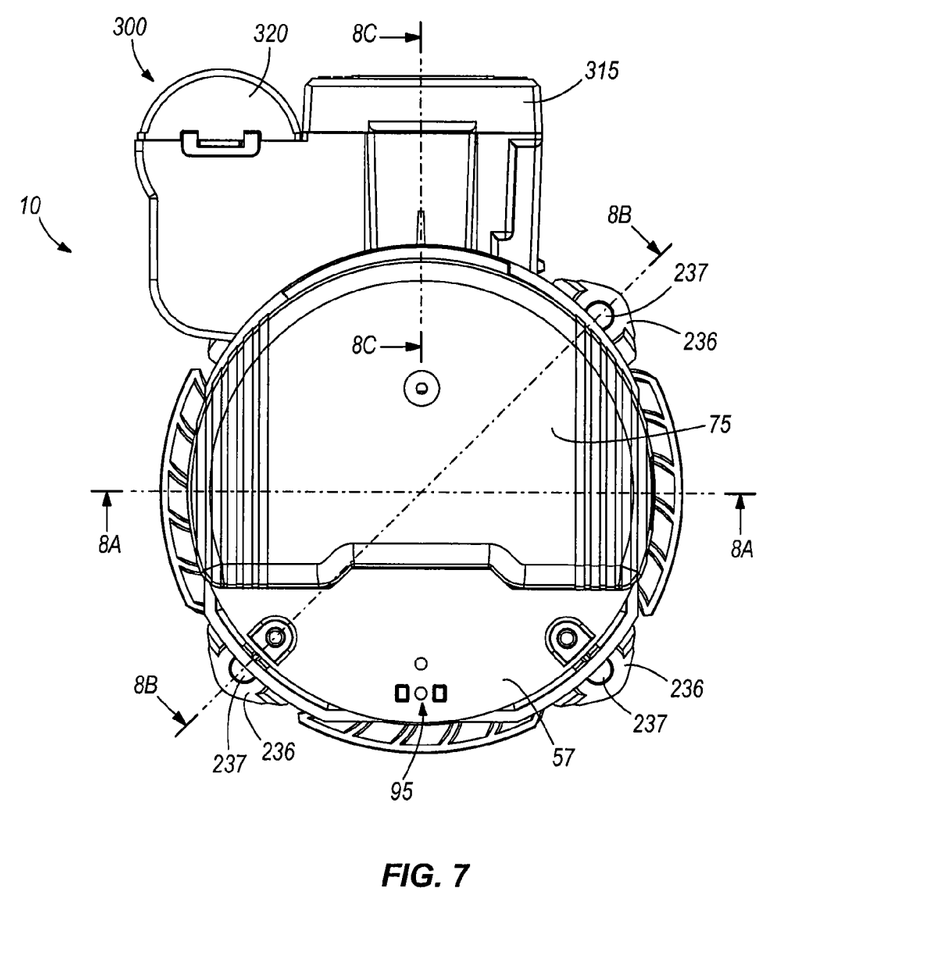
FIG. 7 is a front view of the motor assembly illustrating section lines 8A-8A, 8B-8B, and 8C-8C.

In the illustrated construction, each of the through apertures 45 is formed near one corresponding arcuate surface 40; however, other constructions can include the apertures 45 placed in other sections of the stator 25. The apertures 45 allow coupling the end frames 50 and 195 to the stator 25, as illustrated in FIGS. 6 and 8B. More specifically, the end frame 50 has therethrough four apertures 51 (FIG. 4), and the end frame 195 has therein four blind apertures 196 (three shown in FIG. 13). As illustrated in FIG. 8B, each of the apertures 51 and 196 is aligned with a respective one of the apertures 45 in the stator 25. Four bolts 12 (two shown in FIG. 8B) each extend through a respective aligned apertures 51 and 45 and into an aligned aperture 196 such that the stator 25 is sandwiched between the end frames 50 and 195. Other features of the end frames 50 and 195 are described below. Alternative constructions of the motor assembly 10 can include the end frames 50 and 195 coupled to the stator 25 in other suitable manners.

Figure 4:
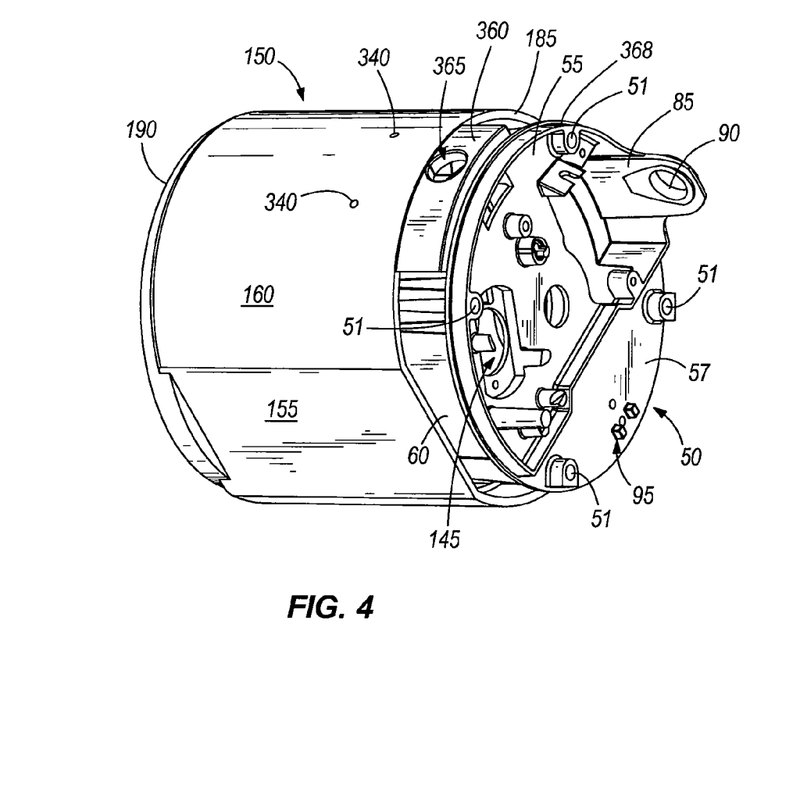
FIG. 4 is a perspective view of a shroud, an end frame and a grommet sandwiched therebetween.

With reference to FIGS. 2, 3 and 4, the end frame 50 includes a mounting surface 55, a control surface 57 and an annular projection or tenon 60. In the illustrated construction, the mounting surface 55 is configured to support a tilted terminal board 65 and a thermostat 70. Other constructions of the motor assembly 10 can include additional devices mounted on the terminal board 65, such as sensors, transformers, capacitors and others. A canopy 75 is configured to engage the end frame 50 to cover the elements (e.g., the tilted terminal board 65) mounted on the mounting surface 55, thus isolating such elements from ambient air. In the illustrated construction, the canopy 75 includes a recess 80 operable to engage and match a protrusion 85 extending from the mounting surface 55. The protrusion 85 has therein an aperture 90. Wiring connected to the components within the canopy 75 passes through the aperture 90. Unlike the mounting surface 55, the control surface 57 is not covered by the canopy 75. The control surface 57 is configured to support a number of buttons, switches and/or indicators 95 that can allow a user to control as well as monitor the motor assembly 10.

With reference to FIGS. 2, 3 and 8B, the end frame 50 also includes four pair of ribs 100 coupled to the tenon 60 and extending axially with respect to the end frame 50. Each of the ribs 100 extends, from a plane defined by the mounting surface 55 and/or the control surface 57, beyond the axial length defined by the tenon 60, thus forming respective coupling tabs 105 each operable to engage one corresponding aperture 45 of the stator 25 (partially shown in FIG. 6). When the end frame 50 is coupled to the stator 25, as illustrated in FIG. 8A, an engaging edge 110 of the tenon 60 comes into contact with the end 42 of the stator 25. As a result, the end frame 50 cooperates with the stator 25 to form the inner space 115 (also illustrated in FIG. 8B) enclosing and protecting from ambient air the windings 30, the bearing 32, and the thermostat 70.

With reference to FIGS. 2 and 10, the thermostat 70 includes a sensing element (not shown) enclosed within a housing 140 with a cap 130. In the illustrated construction, the housing 140 extends through an aperture 145 in the supporting surface 55 (also illustrated in FIG. 4), and the cap 130 includes two tabs 135. The tabs 135 allow coupling the thermostat 70 to the supporting surface 55 via screws or other suitable coupling devices. The housing 140 also includes an open end (not shown) in close proximity to, or in contact with, the windings 30 (FIG. 10) to sense a temperature of the motor assembly 10. Because the thermostat 70 is enclosed in the inner space 115, ambient air does not have an effect on the temperature sensed by the thermostat 70. More over, the housing 140 allows the sensing element of the thermostat 70 to detect a temperature substantially unaffected by the air current generated by the fan 33 during operation of the motor assembly 10. Accordingly, the illustrated construction allows the thermostat 70 to generate a relatively more accurate measurement of the temperature of the motor assembly 10.

With reference to FIGS. 2, 4, 5 and 8A, the motor assembly 10 includes a shroud 150 adapted to enclose the stator 25. The shroud 150 includes a first or right end 185 and a second or left end 190. In the illustrated construction, the shroud 150 includes three flat portions 155 and three arcuate portions 160 such that at least a section of the flat portions 155 and/or arcuate portions 160 engages or abuts the flat surfaces 35 and/or arcuate surfaces 40 of the stator 25 to at least partially support the shroud 150 with respect to the stator 25. The shroud 150 and the stator 25, when engaged to one another, cooperate to form air passages 165 between portions 155, 160 on opposite sides of the stator 25 (best shown in FIG. 8A) such that the air passages 165 extend axially from the end 42 to the end 44 of the stator 25. Moreover, the shroud 150 and the end frame 50 cooperate to form therebetween, on opposite sides of the motor and at the right end 185 of the shroud, a first set of air inlet apertures 170 in fluid communication with the air passages 165. It can be observed that air flowing through the apertures 170 and the air passages 165 does not come into contact with the inner space 115. In an alternative construction, the stator 25 can include through apertures (similar to through apertures 45) substantially parallel to air passages 165 allowing the stator 25 to improve cooling capacity by providing additional heat exchange surfaces.

Figure 5:
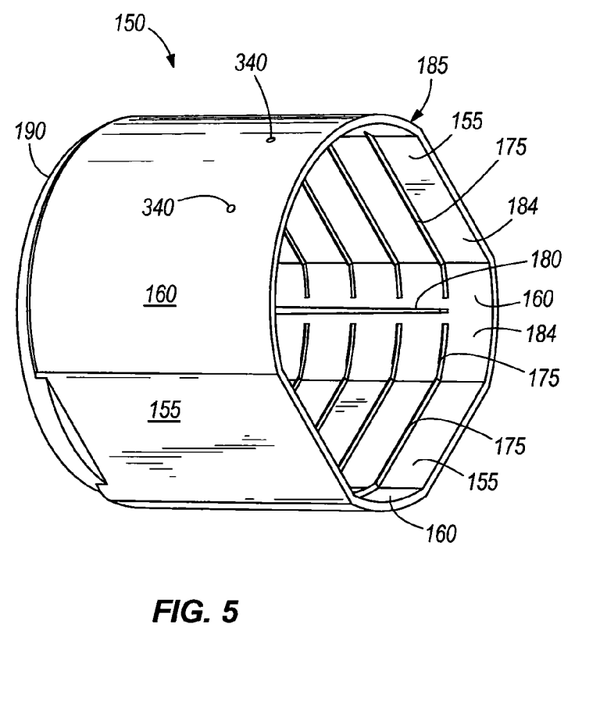
FIG. 5 is a perspective view of the shroud illustrated in FIG. 4.

With reference to FIGS. 5 and 8A, the shroud 150 can include a number of tabs or baffles 175 and ribs 180 (only one shown in FIG. 5) extending inwardly from an inner surface 184 of the shroud 150 defined by portions 155, 160. The baffles 175 help create air turbulence within the air passages 165 when air is flowing through the air passages 165 such that heat exchange between cooling air and the surfaces 35, 40 is improved. The ribs 180 allow for improved contact between the shroud 150 and the stator 25. In the illustrated construction, the baffles 175 are oriented perpendicularly with respect to the air passages 165, while the ribs 180 are oriented parallel with respect to the air passages 165. However, other constructions of the shroud 150 can include baffles 175 and ribs 180 oriented differently.

Figure 13:
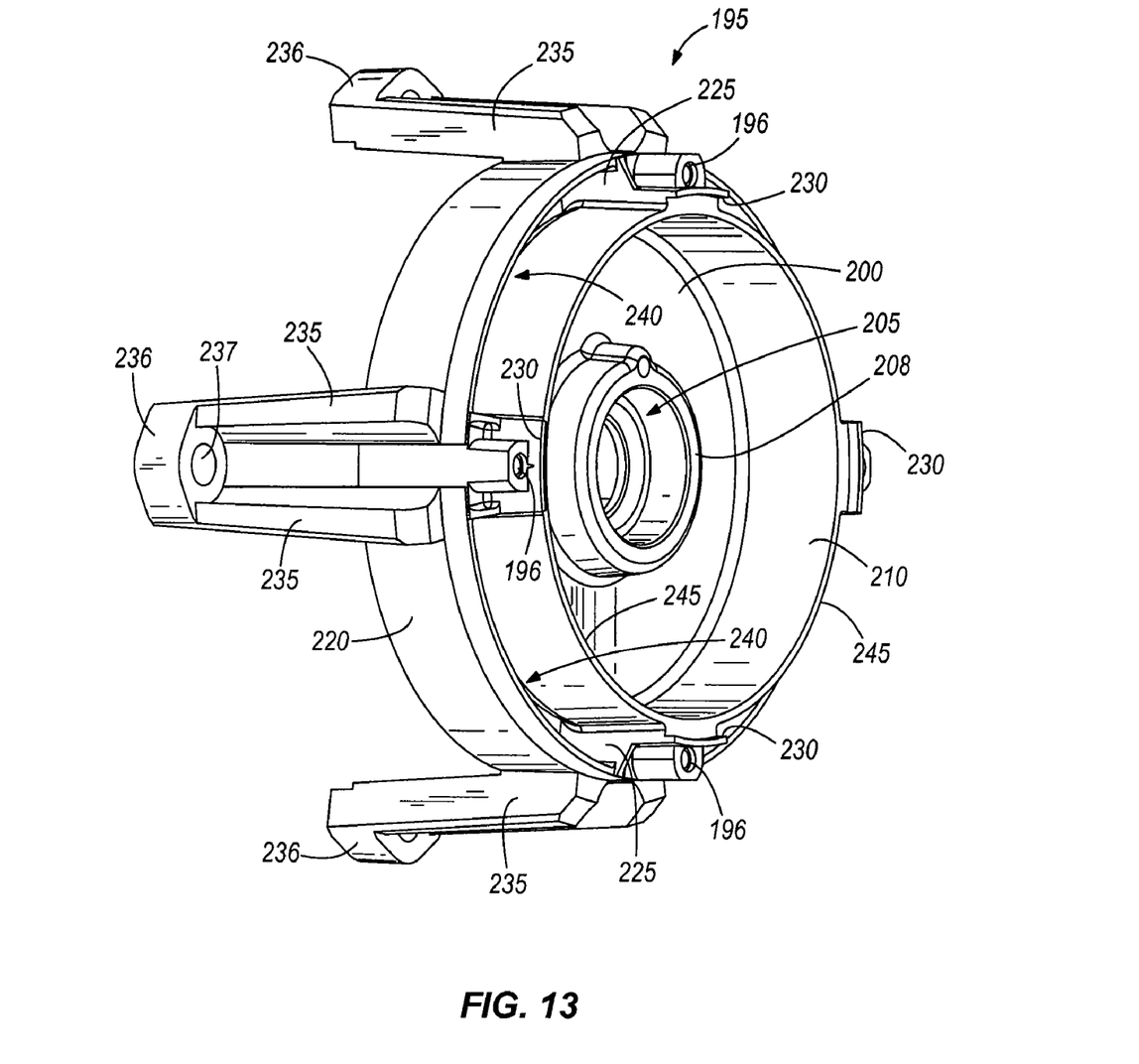
FIG. 13 is a perspective view of the second end frame illustrated in FIG. 6.

With reference to FIGS. 3, 5, 8A and 8B, the left end 190 of the shroud 150 defines a substantially circular aperture and is operable to engage the left end frame 195 of the motor assembly 10. As illustrated in FIGS. 6 and 13, the end frame 195 includes a substantially circular plate 200 with a central aperture 205 through which the shaft 20 extends, a second bearing seat 208 supporting the bearing 34 (illustrated in FIGS. 8A and 8B), a tenon 210, and an outer ring 220. The ring 220 is connected to the tenon 210 by four coupling portions 225 each defining one corresponding aperture 196. The coupling portions 225, the tenon 210 and the outer ring 220 define therebetween arcuate air outlet apertures 240 in fluid communication with the air passages 165 and the air apertures 170. As illustrated in FIGS. 8A and 8B, the tenon 210 engages the end 44 of the stator 25 and the outer ring 220 slidingly fits within the end 190 of the shroud 150. Four tabs 230, each radially aligned with a corresponding coupling portion 225, extend from the tenon 210 and into corresponding apertures 45 of the stator 25 such that an engaging edge 245 of the tenon 210 contacts the end 44 of the stack of laminations, forming the second inner space 255. The inner space 255 is adapted to enclose corresponding end turns of the windings 30, the bearing 34 and the fan 215.

With reference to FIGS. 2, 3 and 8A, the motor assembly 10 also includes a fan 260 externally mounted on the shaft 20 between the end frame 195 and an adapter 275, further described below. The fan 260 includes a mounting portion or hub 262 to fixedly engage the shaft 20, a flat inner ring 263 generally perpendicular to the shaft 20, and an outer portion 264. The outer portion 264 includes an outer ring section 265 and a concave inner section 266. A number of fins 267 extend between the inner ring 263 and the outer portion 264. The fan 260 is operable to generate a fluid flow through the motor assembly 10 for cooling purposes. More specifically, operating the motor assembly 10 causes the fan 260 to generate air flow though the air passages 165, allowing air to come into heat exchange relationship with the surfaces 35, 40 of the stator 25. The fan 260 generates flow such that ambient air enters the motor assembly 10 through apertures 170, flows through air passages 165 and exits the motor assembly 10 through apertures 240, as indicated by arrows 270 in FIG. 8A.

With reference to FIG. 13, the end frame 195 also includes four pairs of legs 235, with each pair of legs 235 being connected to a coupling portion or foot 236. Each foot 236 has therein an aperture 237. Each pair of legs 235 is radially aligned with a corresponding coupling portion 225, and the legs 235 extend axially from the outer ring 220 in the opposite direction with respect to the tabs 230 to couple the end frame 195 to the adapter 275. As illustrated in FIGS. 2, 3 and 8B, the adapter 275 includes a ring support structure 280, four sets of louvers 290, and four coupling portions 285 integrally formed with the support structure 280. In the illustrated construction, each coupling portion 285 has therein an aperture 286 allowing the adapter 275 to couple the end frame 195 to a pump 400 with bolts 405. Each bolt 405 is placed through the aperture 237 of a foot 236, through the aperture 286 of a coupling portion 285, and into a frame of the pump 400 (schematically shown in FIG. 8B). Furthermore, each of the coupling portions 285 includes a second aperture 287 to receive a coupling element, such as a bolt 410, to further secure the motor assembly 10 to the pump 400. Alternative constructions can include other types of adapters coupling the motor assembly 10 to the pump 400.

Figure 11:
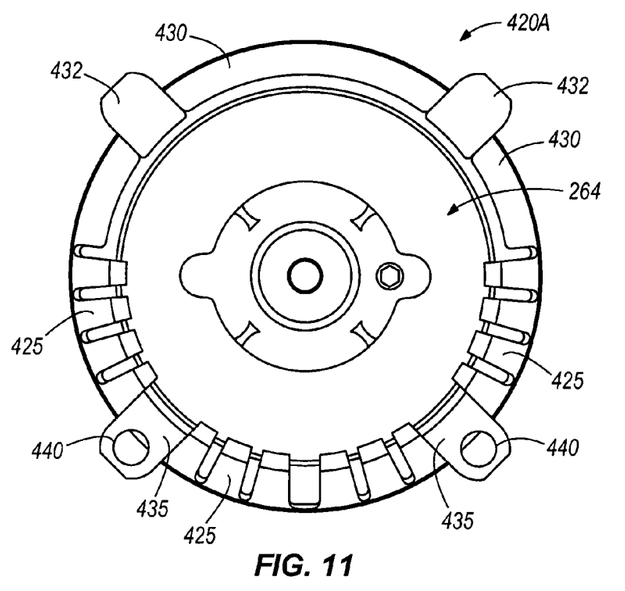
FIG. 11 is an elevation view of a first alternate adapter.
Figure 12:
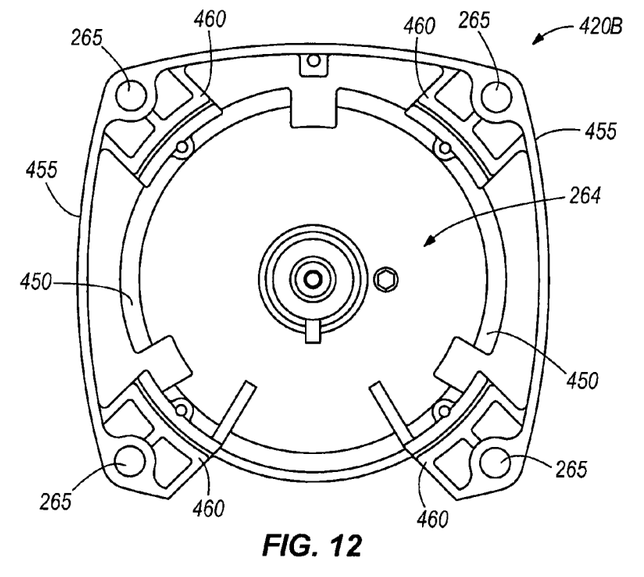
FIG. 12 is an elevation view of a second alternate adapter.

For example, FIGS. 11 and 12 illustrate adapters 420A and 420B generally referred to as C-frame adapter and square frame adapter, respectively. The adapters 420A and 420B allow coupling the motor assembly 10 to pumps associated with each adapter 420A and 420B. As a result, the motor assembly 10 can be adapted to operate different types of pumps (e.g., pump 400) by simply exchanging adapters. FIG. 11 is an elevation view of the adapter 420A coupled to the motor assembly 10. The adapter 420A includes three sets of louvers 425 integrally formed with a ring support 430 having two engaging tabs 432 and two coupling portions 435. Each coupling portion 435 includes an aperture 440 similar to the aperture 286 of the adapter 275. FIG. 12 is an elevation view of the adapter 420B coupled to the motor assembly 10. The adapter 420B includes a support 450 and a U-shaped outer portion 455 connected to the tenon 450 via four connecting portions 460. The four connecting portions 460 define a substantially square shape and each includes a receiving aperture 265 similar to the aperture 286 of the adapter 275.

For jetted fluid applications, the adapter 275 allows coupling of the motor assembly 10 to the pump 400, as illustrated in FIG. 8B. It is possible for a fluid (e.g., water) to leak from the pump 400. In an effort to prevent such water from coming into contact with inner parts of the motor assembly 10 (generally more susceptible to damage from water), the fan 260 is placed between the motor and the pump 400. The fan 260 blocks water leakage from the pump 400, and air flow generated by the fan 260 further repels water leakage from the pump 400.

With reference to FIGS. 2, 3, 9 and 14, the motor assembly 10 also includes a housing 300 having a first compartment 305 adapted to enclose an electronic 306 module (not shown), a second compartment 310 adapted to enclose a run and/or split capacitor (not shown), a first cap 315 operable to enclose compartment 305, and a second cap 320 operable to enclose compartment 310. The housing 300 includes, on the right end as seen in FIGS. 2 and 4, a locking tab 321. The housing 300 also includes, on the left end as seen in FIG. 3, a receiving aperture 322 opposite to the locking tab 321. The tab 321 is adapted to interengage with a locking member 323 protruding from the right end of the cap 320 as seen in FIGS. 2 and 4. The aperture 322 of the housing 300 and an aperture 324 of the cap 320 (FIG. 3) are adapted to receive a coupling mechanism (e.g., a screw) to secure the cap 320 to the housing 300, thus enclosing compartment 310.

Figure 8C:
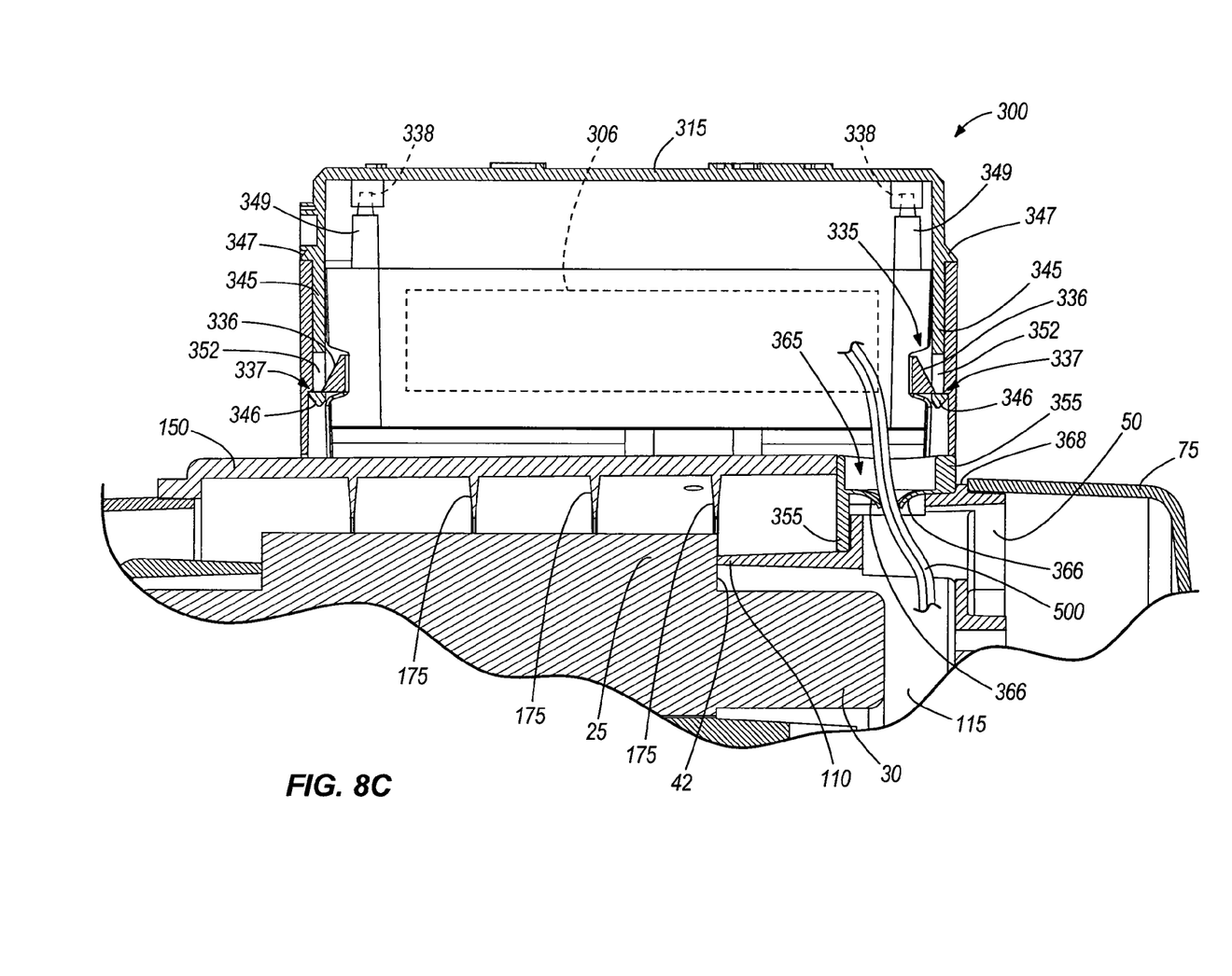
FIG. 8C is a section view of the motor assembly along line 8C-8C shown in FIG. 7.
Figure 14:
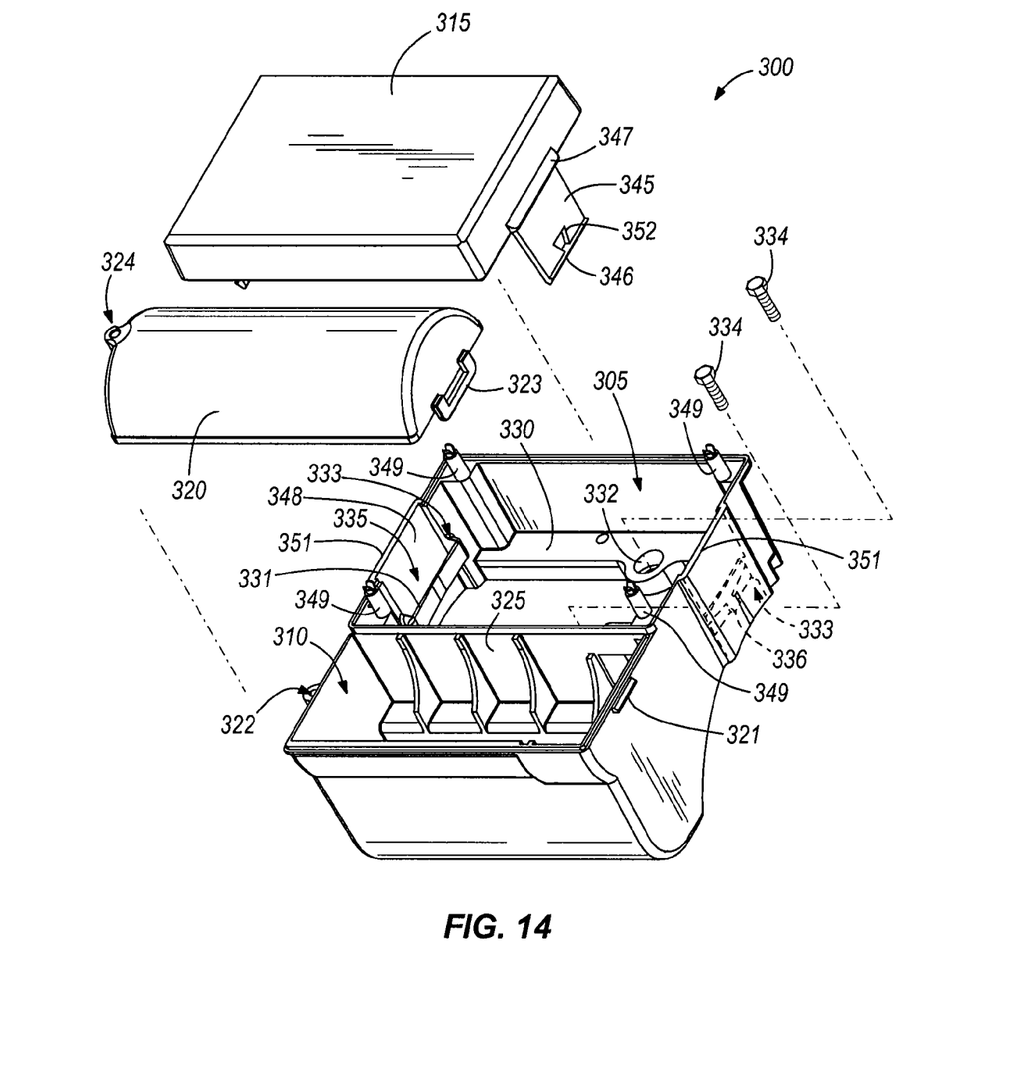
FIG. 14 is a perspective view of a housing illustrated in FIGS. 2 and 3.

As illustrated in FIG. 14, the cap 315 includes, on the opposite ends thereof, coupling legs 345 adapted to engage respective locks 335 inside the housing 300. More particularly, as illustrated in FIGS. 8C and 14, each of the legs 345 includes a stop or lip or shoulder 347 protruding from the top of the leg 345, a foot or lip or shoulder 346 protruding from the bottom of the leg 345, and a receiving aperture 352 adjacent to the foot 346. Each lock 335 includes a wall 331 spaced from the inner wall of the housing 300 and a downwardly facing shoulder 337 on the inner wall of the housing 300. The wall 331 is coupled to the inner wall of the housing 300 with two opposed coupling portions 333 and includes a protrusion 336 with a ramped surface 336 (shown in FIG. 8C). The cap 315 also has therein, on the underside thereof, four apertures 338 (shown in phantom in FIG. 8C), with one aperture 338 at each corner of the cap 315. The housing 300 has thereon, at four locations aligned with the apertures 338, four studs 349. When the cap 315 is placed on the housing 300, the legs 345 are placed inside the housing 300 such that the feet 346 slide along inner walls 348 into engagement beneath the respective shoulders 337 after clearing the shoulders 337 and the protrusions 336 are received in corresponding apertures 352 of the feet 345. As a consequence, the shoulders 337 and protrusions 336 hold the feet 345 in engagement locks 335 of the housing 300. Concurrently, the studs 349 are inserted into respective apertures 338 to further secure the cap 315 on the housing 300. Other constructions of the housing 300 can include the studs 349 protruding from other sections of the compartment 305, as well as a different number of studs 349. In the locked position of the cap 315, the stops 347 engage an upper edge 351 of the housing 300. This construction allows the cap 315 to cover the compartment 305 such that the electronic module 306 is totally enclosed and the compartment 305 is relatively tamper proof, allowing no disengagement of the cap 315 from the housing 300 without destroying the cap or the housing. In other words, the compartment 305 is substantially permanently sealed.

Figure 9:
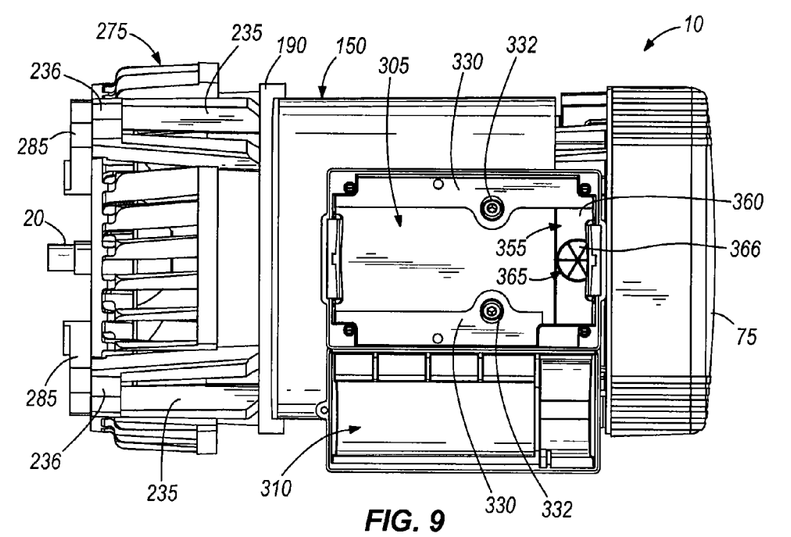
FIG. 9 is a top view of the motor assembly illustrating a housing with a first compartment and a second compartment.

With reference to FIGS. 9 and 14, the compartment 305 and the compartment 310 are separated by an intermediate wall 325 therebetween. The compartment 305 includes an open bottom which is defined by two coupling portions 330 having therein receiving apertures 332 adapted to receive suitable coupling mechanisms, such as screws or bolts 334, to couple the housing 300 to the shroud 150. In the illustrated construction, the shroud 150 includes two receiving holes 340 each aligned with one corresponding aperture 340 and adapted to receive a screw 334. Accordingly, the apertures 332 align with the receiving holes 340 to allow coupling of the housing 300 to the shroud 150 with the screws 334. Subsequent to engaging the cap 315 to the housing 300, as described above, the screws 334 cannot be removed to disengage the housing 300 from the shroud 150. Thus, supporting the relatively tamper proof feature of the compartment 305. In an alternative construction, the shroud 150 can include other coupling mechanisms, such as axially extending rails or tabs, to receive and support the housing 300.

With reference to FIGS. 2, 4, 8C and 9, the open bottom of the compartment 305 aligns with an aperture 350 (also illustrated in FIG. 6) defined by the tenon 60 allowing cabling or wiring 500 to connect the electronic module 306 to the thermostat 70 and/or terminal board 65, for example. A grommet 355 is mounted radially between the compartment 305 and the tenon 60. The grommet 355 includes an upper surface 360 defining an aperture 365 with flexible tabs 366 substantially closing the aperture 365, and a lower edge 370 defining an open bottom and engaging the tenon 60. In an assembled mode of the motor assembly 10, the grommet 355 is sandwiched between a rim 368 of the end frame 50 (better illustrated in FIG. 4) and the end 185 of the shroud 150 such that the upper surface 360 and the shroud 150 help enclose the open bottom of the compartment 305.

Various features and advantages of the invention are set forth in the following claims.

What is claimed is:

1. A motor assembly comprising:
a stator including a set of windings;
a rotor mounted on a rotating shaft and operable to rotate with respect to the stator;
a first end frame coupled to the stator and rotatably supporting the shaft;
a second end frame coupled to the stator and rotatably supporting the shaft, the second end frame including at least one air outlet aperture;
an air shroud surrounding the stator between the first end frame and the second end frame, the air shroud cooperating with the stator to form at least one air passage, and cooperating with the first end frame to form at least one air inlet aperture, the at least one air inlet aperture, the at least one air passage and the at least one air outlet aperture being in fluid communication with one another; and
a fan mounted on the rotating shaft, the fan operable to generate an air flow of ambient air through the at least one air inlet aperture, the at least one air passage and the at least one air outlet aperture.

2. The motor assembly as claimed in claim 1, wherein the shroud includes at least one baffle protruding from an inner surface of the shroud, the at least one baffle enclosed within the at least one air passage.

3. The motor assembly as claimed in claim 1, further comprising an adapter for connecting the motor assembly to a pump, the adapter coupled to the second end frame, wherein the fan is placed substantially between the second end frame and the adapter.

4. The motor assembly as claimed in claim 1, wherein the first end frame cooperates with the stator to form therebetween a first inner space for enclosing at least a portion of the windings, the first inner space restricted from fluid communication with the at least one air passage.

5. The motor assembly as claimed in claim 1, wherein the second end frame includes
an annular tenon engaging the stator to form a second inner space therebetween, and
a ring surrounding the tenon and defining therebetween the at least one air outlet aperture.

6. The motor assembly as claimed in claim 5, wherein the air outlet aperture is arcuate, and wherein the second end frame includes three additional arcuate air outlet apertures defined between the annular tenon and the ring.

7. The motor assembly as claimed in claim 1, wherein the shroud cooperates with the stator to form two air passages, the air passages located on opposite sides of the stator.

8. The motor assembly as claimed in claim 1, further comprising a pump wherein
the second end frame is connected to the pump,
the shaft is operable to drive the pump, and
the fan is mounted on the shaft between the stator and the pump, the fan operable to generate the air flow by pulling ambient air through the motor assembly such that the air flow enters the motor assembly through the at least one air inlet aperture, flows through the at least one air passage, and exits the motor assembly through the at least one air outlet aperture.

9. The motor assembly as claimed in claim 8, further comprising an adapter between the second end frame and the pump, the adapter operable to couple the second end frame to the pump.

10. The motor assembly as claimed in claim 9, wherein the second end frame includes a plurality of legs with respective leg coupling portions, the legs extending axially in the direction away from the first end frame, and wherein the adapter includes, for each of the legs, a respective adapter coupling portion, each of the leg coupling portions and the associated adapter coupling portion having therethrough apertures for receiving an associated bolt for coupling the second end frame and the adapter to the pump.

11. A motor assembly comprising:
a stator including a set of windings;
a rotor mounted on a rotating shaft and operable to rotate with respect to the stator;
a first end frame coupled to the stator and rotatably supporting the shaft;
a second end frame coupled to the stator and rotatably supporting the shaft;
an air shroud mounted between the first end frame and the second end frame, the air shroud enclosing the stator; and
a housing coupled to the air shroud and defining an inner space containing an electronic module operable to control the motor assembly, the housing including a cap that snaps onto the housing and is operable to permanently seal the inner space, a first wall with a downwardly facing shoulder, and a second wall with a protrusion, the second wall spaced from the first wall, wherein the cap includes a foot engaging the shoulder and an aperture receiving the protrusion.

12. The motor assembly as claimed in claim 11, wherein the housing includes an open bottom, and wherein the air shroud at least partially closes the open bottom.

13. The motor assembly as claimed in claim 12, wherein the housing includes a coupling portion with a coupling aperture therethough such that the coupling aperture aligns with a receiving aperture of the shroud and a screw is received in the coupling aperture and receiving aperture.

14. The motor assembly as claimed in claim 11, wherein the first end frame cooperates with the stator to form therebetween a second inner space for enclosing at least a portion of the windings, the second inner space restricted from fluid communication with ambient air.

15. The motor assembly as claimed in claim 14, further comprising at least one wiring element extending from the electric module to the second inner space.

16. The motor assembly as claimed in claim 15, further comprising a grommet between the housing and the first end frame, wherein the grommet at least partially closes the inner space of the housing, and wherein the grommet includes an aperture for allowing therethrough the at least one wiring element.

17. A motor assembly comprising:
a stator including a set of windings;
a rotor mounted on a rotating shaft and operable to rotate with respect to the stator;
a first end frame rotatably supporting the shaft and coupled to the stator to form a first compartment enclosing at least one portion of the set of windings; and
a thermostat coupled to the first end frame such that the thermostat is enclosed in the first compartment in thermal relationship with the at least one portion of the set of windings, wherein the thermostat includes a casing with at least one open end, and wherein the open end is coupled to the set of windings.

18. The motor assembly as claimed in claim 17, wherein the first end frame includes an opening, and wherein the thermostat extends through the opening.

19. The motor assembly as claimed in claim 18, further comprising a housing with an inner space containing an electronic module operable to control the motor assembly, wherein the first compartment is connected to the inner space via at least one wiring element.

20. The motor assembly as claimed in claim 19, further comprising a grommet between the first end frame and the housing, wherein the grommet to at least partially close the inner space of the housing, and wherein the grommet includes an aperture for allowing therethrough at least one wiring element connected to the electronic module.

* * * * *